United States Patent [19]

Kono et al.

[11] Patent Number: 4,873,034
[45] Date of Patent: Oct. 10, 1989

[54] PROCESS FOR PRODUCING MICROPOROUS ULTRA-HIGH-MOLECULAR-WEIGHT POLYOLEFIN MEMBRANE

[75] Inventors: Koichi Kono, Asaka; Kenkichi Okamoto; Rumi Iwasaki, both of Yokohama; Shuichi Sawada, Ooi, all of Japan

[73] Assignee: Toa Nenryo Kogyo Kabushiki Kaisha, Tokyo, Japan

[21] Appl. No.: 223,123

[22] Filed: Jul. 22, 1988

[51] Int. Cl.$^4$ .................. B29C 47/78; B29C 55/04; B29C 55/12; C08J 9/28

[52] U.S. Cl. .................. 264/41; 210/500.36; 264/210.4; 264/211.19; 264/288.8; 264/289.3; 264/289.6; 264/290.2; 264/344

[58] Field of Search .............. 264/41, 164, 210.2, 264/210.3, 210.4, 211.13, 211.19, 233, 288.8, 289.3, 289.6, 290.2, 344; 210/500.36

[56] References Cited

U.S. PATENT DOCUMENTS

| 3,954,927 | 5/1976 | Duling et al. ............ 264/49 |
| 4,413,110 | 11/1983 | Kavesh et al. ............ 264/164 X |
| 4,472,328 | 9/1984 | Sugimoto et al. ............ 264/41 |
| 4,551,296 | 11/1985 | Kavesh et al. ............ 264/203 |
| 4,588,633 | 5/1986 | Kono et al. ............ 428/220 |
| 4,620,955 | 11/1986 | Kono et al. ............ 264/41 |
| 4,734,196 | 3/1988 | Kono et al. ............ 210/500.36 |

FOREIGN PATENT DOCUMENTS 58-5228 1/1983 Japan .
60-242035 12/1985 Japan .

Primary Examiner—Jeffery Thurlow
Assistant Examiner—Leo B. Tentoni
Attorney, Agent, or Firm—Armstrong, Nikaido, Marmelstein, Kubovcik & Murray

[57] ABSTRACT

A process for producing a relatively thick microporous ultra-high-molecular-weight polyolefin membrane, including the steps of: (1) preparing a solution of an ultra-high-molecular-weight polyolefin having a weight-average molecular weight of $5 \times 10^5$ or more; (b) extruding the solution from a die while rapidly cooling it in advance to its gelation temperature or below, thereby forming a gel-like sheet; (c) removing at least 10 wt % of the solvent from the gel-like sheet so that the gel-like sheet contains 10 to 90 wt % of the ultra-high-molecular-weight polyolefin; (d) stretching the gel-like sheet at a temperature equal to or lower than that which is 10° C. above the melting point of the ultra-high-molecular-weight polyolefin; and (e) removing the residual solvent from the stretched product.

9 Claims, No Drawings

PROCESS FOR PRODUCING MICROPOROUS ULTRA-HIGH-MOLECULAR-WEIGHT POLYOLEFIN MEMBRANE

BACKGROUND OF THE INVENTION

The present invention relates to a process for producing a microporous membrane of ultra-high-molecular-weight polyolefin, especially ultra-high-molecular-weight polyethylene. More particularly, it is concerned with a process for efficiently producing a uniform and relatively thick microporous membrane of an ultra-high-molecular-weight polyolefin.

Microporous membranes are widely used in various applications such as battery separators, electrolytic capacitor separators, various filters, moisture-permeable, waterproof clothes, reverse osmosis membranes, ultrafilters, microfilters, etc.

Microporous polyolefin membranes are conventionally produced by various processes. One example of such processes is an extraction process comprising the steps of mixing a polyolefin with a pore-forming agent such as a fine powder or a different polymer in such a manner as to achieve micro-dispersion and subsequently extracting the dispersed pore-forming agent. Another process is a phase separation process by which polyolefin is divided into fine phases by a solvent, thereby forming a porous structure. Further, there is a stretching process comprising the steps of forming a polyolefin article containing different solid finely dispersed therein and imparting a strain to the article by stretching to break the interfaces between the polymer phase and the different solids, thereby forming pores in the article. In these processes, however, polyolefins having a molecular weight lower than 500,000 are usually used, so that the thinning and strengthening of membranes by stretching are limited.

Recently, there has been developed a ultra-high-molecular-weight polyolefin which can be formed into a high-strength, high-modulus fiber or film. With this development, there have been proposed various processes for producing high-strength and high-modulus fibers or films from it.

One of such process is disclosed in, for example, Japanese Patent Laid-Open No. 58-5228. According to this process, an ultra-high-molecular-weight polyolefin is dissolved in a nonvolatile solvent and the resulting solution is made into a gel in the form of fiber or sheet. The solvent-containing gel or dry gel from which the solvent has been extracted with a volatile solvent is stretched while heating. This process is, however, disadvantageous in that the solvent containing gel cannot be biaxially stretched at a high draw ratio because it has a porous structure highly swollen with a nonvolatile solvent. The resulting membrane has a low strength and a large pore diameter on account of its reticulate structure which easily expands and breaks. Another disadvantage of this process is that the gel extracted with a volatile solvent in the form of a sheet is liable to warpage because of uneven evaporation of the volatile solvent. Further, it cannot be subjected to stretching at a high draw ratio because of the shrinkage and compaction of the reticulate structure of the gel which take place after the extraction of the nonvolatile solvent by a volatile solvent.

Japanese Patent Laid-Open No. 60-242035 discloses a process for producing a microporous ultra-high-molecular-weight polyethylene membrane having a thickness of 10 μm or less, a breaking strength of 200 kg/cm² or more, and a void volume of 30% or more by dissolving ultra-high-molecular-weight polyethylene having a weight-average molecular weight of $5 \times 10^5$ or more in a solvent while heating, forming a gel-like sheet from the resulting solution, removing a solvent from the gel-like sheet until the solvent content decreases to 10–80 wt %, and then stretching the sheet while heating, thereby removing a residual solvent.

According to this process, the gel-like sheet is usually about 0.1–5 mm thick, and it is produced from a solution containing 1–10 wt % of polyethylene. After the removal of solvent, the gel-like sheet is biaxially stretched such that the linear draw ratio is twofold or more and the areal draw ratio is tenfold or more.

Unfortunately, being as thin as 10 μm or less, the microporous ultra-high-molecular-weight polyethylene membrane thus produced is not suitable for use in applications where high strength and high pressure resistance are required. Any attempt to produce a thicker membrane by increasing an amount of a polymer solution cast on a substrate, however, inevitably leads to a reduced cooling rate which promotes crystallization of the polymer to such an extent that stretching is not easily achieved. Further, in the case where the gel-like sheet is formed by extrusion of an ultra-high-molecular-weight polyethylene solution from a die, any attempt to increase a thickness of the extruded sheet fails to provide a uniform sheet because of excessive swelling and neck-in. In addition, the thicker a sheet, the more slowly it is cooled. Accordingly, excessive crystallization takes place, resulting in a difficult-to-orient molecular structure.

OBJECT AND SUMMARY OF THE INVENTION

Accordingly, it is an object of the present invention to provide a process for efficiently producing a uniform, thick, microporous membrane from an ultra-high-molecular-weight polyolefin.

To achieve the above-mentioned object, the present inventors have carried out intense research, which has led to the finding that it is possible to form a thick gel-like sheet capable of being made microporous by cooling a solution of an ultra-high-molecular-weight polyolefin in advance to a certain extent in a die. The present invention has been completed on the basis of this finding.

Thus, the process for producing a relatively thick, microporous ultra-high-molecular-weight polyolefin membrane comprises the steps of (a) preparing a solution of an ultra-high-molecular-weight polyolefin having a weight-average molecular weight of $5 \times 10^5$ or more; (b) extruding the solution from a die while rapidly cooling it to its gelation temperature or below, thereby forming a gel-like sheet; (c) removing at least 10 wt % of the solvent from the gel-like sheet, so that the gel-like sheet contains 10–90 wt % of the ultra-high-molecular-weight polyolefin; (d) stretching the gel-like sheet at a temperature equal to or lower than that which is 10° C. above the melting point of the ultra-high-molecular-weight polyolefin; and (e) removing the residual solvent from the stretched product.

DETAILED DESCRIPTION OF THE INVENTION

The ultra-high-molecular-weight polyolefin that can be used in the present invention is one which has a weight-average molecular weight of $5 \times 10^5$ or more, preferably in the range of $1 \times 10^6$ to $15 \times 10^6$. With a weight-average molecular weight lower than $5 \times 10^5$, the resulting membrane does not have high modulus and high strength which are characteristic of ultra-high-molecular-weight polyolefin. Although there is no upper limit in molecular weight, polyolefins having a molecular weight in excess of $15 \times 10^6$ are poor in formability of their gel-like sheets.

Examples of such ultra-high-molecular-weight polyolefins include crystalline homopolymers or copolymers of ethylene, propylene, 1-butene, 4-methyl-1-pentene, 1-hexene, etc. Preferable among them is ultra-high-molecular-weight polyethylene composed mainly of ethylene. Incidentally, the above-mentioned ultra-high-molecular-weight polyolefins may be incorporated with various additives such as antioxidants, ultraviolet absorbers, slip agents, antiblocking agents, pigments, dyes, inorganic fillers, etc., if required within limits not harmful to the object of the invention.

The solution of an ultra-high-molecular-weight polyolefin used in the present invention is prepared by dissolving the above-mentioned polyolefin having a weight-average molecular weight of $5 \times 10^5$ or more in a solvent while heating. The solvent is not specifically limited so long as it is capable of dissolving the ultra-high-molecular-weight polyolefin. Examples of the solvents include aliphatic or cyclic hydrocarbons such as nonane, decane, undecane, dodecane, decalin, paraffin oils, etc., and fractions of mineral oils having boiling points substantially equal to those of these hydrocarbons. Nonvolatile solvents such as paraffin oils are desirable to obtain the gel-like sheets in which the solvent content is stable.

Dissolution of the ultra-high-molecular-weight polyolefin while heating should be carried out by stirring its solution at a temperature at which it is completely dissolved in a solvent. The dissolving temperature varies depending on the types of polymer and solvent used. It is generally in the range of 140°–250° C. for ultra-high-molecular-weight polyethylene. The concentration of the solution of ultra-high-molecular-weight polyolefin is preferably 1–10 wt %. A solution of excessively high concentration tends to lack uniformity. It is desirable to add an antioxidant to the solution to protect the polyolefin from degradation by oxidation.

The heated solution of an ultra-high-molecular-weight polyolefin is extruded from a die while being rapidly cooled. The rapid cooling is performed preferably at a rate of 50° C./min or more until the extrudate is cooled to the gelation temperature or below. The cooling temperature (equal to or lower than gelation temperature) is, for example, 90° C. or below, preferably 50°–60° C., in the case of ultra-high-molecular-weight polyethylene. The rapid cooling is achieved by circulating water in the die or immersing the die in water. However, if different coolants are used, other cooling methods can be used.

It has been expected that the solution of an ultra-high-molecular-weight polyolefin cannot easily be extruded from a die when gelation takes place. However, the present inventors have unexpectedly found that the ultra-high-molecular-weight polyolefin gel can be extruded relatively easily. The reason for this is not yet fully clarified, but it is considered that the die with a relatively wide slit exerts a low resistance to the gel of ultra-high-molecular-weight polyolefin which has been swollen by a nonvolatile solvent such as paraffin oil.

For this reason, it is possible to obtain an article such as a sheet of the ultra-high-molecular-weight polyolefin gel, which is as thick as 5–20 mm, more particularly 5–10 mm. This gel-lie article is usually in a sheet form. Incidentally, the extrusion sped is usually a few centimeters to a few meters per minute, particularly 2–3 cm/min to 2–3 m/min depending on the temperature of the solution and solvent and the length of a cooling zone.

The gel-like sheet is subsequently stripped of the nonvolatile solvent. The removal of the solvent may be accomplished by dipping the gel-like sheet in a highly volatile solvent for extraction, followed by drying, compressing or heating the gel-like sheet. These steps may be conducted in combination. The extraction of a nonvolatile solvent with a highly volatile solvent is desirable because of its ability to remove the nonvolatile solvent without considerably changing th structure of the gel-like sheet. The extraction can be conducted quickly when it is combined with compression. Examples of highly volatile solvents include hydrocarbons such as pentane, hexane and heptane; chlorinated hydrocarbons such as methylene chloride and carbon tetrachloride; fluorinated hydrocarbons such as trifluoroethane; and ethers such as diethyl ether and dioxane. These volatile solvents may be used individually or in combination, and their selection depends on the types of the nonvolatile solvents used to dissolve the ultra-high-molecular-weight polyolefin.

The amount of the nonvolatile solvent to be removed from the gel-like sheet should be at least 10 wt % of the nonvolatile solvent contained therein. In other words, it is necessary that the solvent be removed so that the gel-like sheet contains 10–90 wt % preferably 10–60 % of ultra-high-molecular-weight polyolefin. If the amount of the solvent removed is less than 10 wt % and the amount of the polyolefin contained in the gel-like sheet is less than 10 wt %, the gel is liable to become a solution at the time of stretching process while heating, because the gel-like sheet is highly swollen with the solvent. Moreover, such a gel-like sheet is not readily made into a stretched product of uniform thickness on account of the partially uneven stretching. It is also inconvenient to handle because the solvent oozes out during stretching. On the other hand, if the solvent is removed to such an extent that the amount of the polyolefin in the gel-like sheet exceeds 90 wt %, the network structure of the gel-like sheet becomes so compact that the gel-like sheet cannot be stretched at a high draw ratio, with the result that the resulting microporous membrane lacks high modulus and high strength. The amount of nonvolatile solvent to be removed from the gel-like sheet can be controlled by adjusting the amount of the highly volatile solvent for extraction, by adjusting the extraction time, or by adjusting the degree of compressing the gel-like sheet.

In the extraction process of the gel-like sheet, it tends to shrink or warp in three-dimensional directions as a highly volatile solvent absorbed in place of a nonvolatile solvent in the gel-like sheet evaporates. To avoid this phenomenon, the gel-like sheet should preferably shrink selectively in the thickness direction so that it can be made into a smooth, uniform sheet that hardly shrinks in two horizontal directions (longitudinal and transverse directions) and that can be uniformly stretched at a high draw ratio. The shrinkage of the gel-like sheet should be 50% or more, preferably 70% or more in the thickness direction and 20% or less in the longitudinal and transverse directions. The selective shrinking of the gel-like sheet in the thickness direction may be accomplished by evaporating the highly volatile solvent while keeping the gel-like sheet in close contact with a flat support, or by gripping it on both sides, or by holding it between two porous plates.

After the removal of a solvent, the gel-like sheet is subjected to stretching at a predetermined draw ratio while heating. Stretching is accomplished by an ordinary method such as a tenter method, a roll method, an inflation method, a calendering method, or a combination thereof. Biaxial stretching is desirable. It may be carried out by stretching the sheet in longitudinal and transverse directions simultaneously or sequentially.

The stretching temperature should be equal to or lower than a temperature which is 10° C. above the melting point of the ultra-high-molecular-weight polyolefin, preferably in the range from the crystal dispersion temperature to the crystal melting point. In the case of ultra-high-molecular-weight polyethylene, it is 90°–140° C., preferably 110°–130° C. If the stretching temperature is higher than the melting point plus 10° C., the molecular stretching does not take place because the resin melts. If the stretching temperature is lower than the crystal dispersion temperature, the membrane tends to break on account of the insufficient softening of the resin, and the membrane cannot be stretched at a high draw ratio.

The draw ratio varies depending on the thickness of the original sheet. The linear draw ratio in one horizontal (longitudinal or transverse) direction should be greater than twofold, preferably 5- to 20-fold, and the areal draw ratio should be greater than tenfold, preferably 25- to 400-fold. With an areal draw ratio smaller than 10-fold, the resulting microporous membrane lacks high modulus and high strength on account of insufficient stretching On the other hand, with an areal draw ratio in excess of 400-fold, difficulties exist in the stretching operation.

The thus stretched product is further dipped in the above-mentioned highly volatile solvent for the extraction and removal of a residual solvent, and it is stripped of the volatile solvent by evaporation and drying steps. The extraction of the solvent should be performed to such an extent that the content of the residual solvent in the stretched product is less than 1 wt %.

The microporous ultra-high-molecular-weight polyolefin membrane produced as mentioned above has a void volume of 30% or more and a pore diameter of 0.001 to 0.5 μm. In addition, it has a relatively large thickness of 10 μm or more, preferably 10–50 μm. The microporous membrane obtained according to the process of this invention is useful in applications in which high strength and high pressure resistance are required, because it has a sufficient thickness.

The present invention will be explained in further detail by following Examples. The test methods used in Examples are as follows:

(1) Membrane thickness: Measured by observing the cross section of a microporous membrane by a scanning electron microscope.

(2) Tensile breaking strength: Measured according to ASTM D882, and expressed in term of load at a break point for a 15-mm-wide specimen.

(3) Resistance to passage of air: Measured according to JIS P8117.

(4) Pure water flow rate: Expressed in terms of the amount of filtrate which passed through the hydrophilicized microporous membrane under a hydraulic pressure of 380 mmHg. The hydrophilioization was accomplished by passing a 50/50 (by volume) mixture of distilled water and ethanol through the microporous membrane set in a flat module, followed by thorough washing with distilled water.

(5) Rejection of solutes: Expressed in terms of the concentration of pullulan* contained in a filtrate which passed through the microporous membrane under the differential pressure of 380 mmHg when a 0.05-wt % aqueous solution of pullulan was circulated in the module mentioned in (4) above. The concentration of pullulan was determined by differential refractometry. The rejection of solutes was calculated by the following formula:

$$Rejection\ (\%) = (1 - A/B) \times 100$$

where A is the concentration of pullulan in the filtrate and B is the concentration of pullulan in the original solution.

* Pullulan used here was polysaccharides having a molecular weight of 100,000 and 200,000, respectively, manufactured by Showa Denko K.K.

EXAMPLE 1

An autoclave equipped with a stirrer was charged with 100 parts by weight of a mixture composed of 4.0 wt % of ultra-high-molecular-weight polyethylene having a weight-average molecular weight (Mw) of $2 \times 10^6$ and 96.0 wt % of liquid paraffin (64 oSt at 40° C.), and an antioxidant composed of 0.125 parts by weight of 2, 6-di-t-butyl-p-cresol ("BHT", manufactured by Sumitomo Chemical Industries Co., Ltd.) and 0.25 parts by weight of tetrakis [methylene-3-(3, 5-di-t-butyl-4-hydroxylphenyl)-propionate] methane ("Irganox 1010", manufactured by Ciba Geigy Co., Ltd.). The mixture was stirred at 200° C. for 90 minutes to give a uniform solution.

The solution was fed to an extruder of 45 mm in diameter and extruded from a long-lip T-die (die lip opening=6 mm), a tip end of which was cooled with water. Thus there was obtained a 6-mm-thick gel-like sheet. The sheet emerging from the T-die was at 60° C. in a completely gel state.

This sheet was dipped in 250 ml of methylene chloride for 60 minutes. The wet sheet was attached to a flat plate and dried on it. Thus, there was obtained an original sheet containing 84.0 wt % of liquid paraffin.

The original sheet was cut into a piece of 9 cm by cm. The cut piece underwent simultaneous biaxial stretching by a biaxial stretching machine at 125° C., at a draw speed of 30 cm/min, and at a draw ratio of 7×7. The resulting stretched membrane was washed with methylene chloride to remove residual liquid paraffin and then dried. Thus, there was obtained a microporous membrane of ultra-high-molecular-weight polyethylene. The properties of the microporous membrane are shown in Table 1.

EXAMPLE 2

A 22-μm-thick, microporous membrane of ultra-high-molecular-weight polyethylene was prepared in the same manner as in Example 1 except that a 6-mm-thick, gel-like sheet was extruded from a die having a die lip opening of 6 mm, that the gel-like sheet was converted into an original sheet containing 80.1 wt % of liquid paraffin by removing the solvent, and that the original sheet underwent simultaneous biaxial stretching at 116° C. and at a draw ratio of 5×5. The properties of the microporous membrane are shown in Table 1.

EXAMPLE 3

A 38-μm-thick, microporous membrane of ultra-high-molecular-weight polyethylene was prepared in the same manner as in Example 1 except that a 8-mm-thick, gel-like sheet was extruded from a die having a die lip opening of 8 mm, that the gel-like sheet was converted into an original sheet containing 78.8 wt % of liquid paraffin by removing the solvent, and that the original sheet underwent simultaneous biaxial stretching at 118° C. and at a draw ratio of 6×6. The properties of the microporous membrane are shown in Table 1.

EXAMPLE 4

A 16-μm-thick, microporous membrane of ultra-high-molecular-weight polyethylene was prepared in the same manner as in Example 1 except that a 10-mm-thick, gel-like sheet was extruded from a die having a die lip opening of 10 mm, that the gel-like sheet was converted into an original sheet containing 85.0 wt % of liquid paraffin by removing the solvent, and that the original sheet underwent simultaneous biaxial stretching at 122° C. and at a draw ratio of 7×7. The properties of the microporous membrane are shown in Table 1.

According to the present invention, a heated solution of ultra-high-molecular-weight polyethylene is rapidly cooled for gelation before extrusion from a die. Therefore, the gel-like extrudate has a uniform thickness without suffering from swelling and neck-in. The resulting microporous membrane has a sufficient thickness to provide high strength and high pressure resistance. It is not only easy to handle but also it can easily be laminated with a nonwoven fabric. The microporous membrane of the present invention will find wide varieties of applications as battery separators, electrolytic capacitor separators, microfilters, ultrafilters, moisture-permeable waterproof clothes, etc.

The present invention has been described by the above Examples, but it should be noted that any modifications can be made unless they deviate from the scope of the present invention defined by the claims attached hereto.

What is claimed is:

1. A process for producing a microporous ultra-high-molecular-weight polyolefin membrane, comprising the steps of:
   (a) preparing a solution of an ultra-high-molecular-weight polyolefin having a weight-average molecular weight of $5 \times 10^5$ or more;
   (b) extruding said solution from a die, said solution being rapidly cooled to its gelation temperature or below before extrusion, thereby forming a gel-like sheet;
   (c) removing at least 10 wt % of said solvent from said gel-like sheet so that said gel-like sheet contains 10 to 90 wt % of said ultra-high-molecular-weight polyolefin;
   (d) stretching said gel-like sheet at a temperature equal to or lower than that which is 10° C. above the melting point of said ultra-high-molecular-weight polyolefin; and
   (e) removing the residual solvent from the stretched product.

2. The process according to claim 1, wherein said ultra-high-molecular-weight polyolefin solution is rapidly cooled at a cooling rate of 50° C./minute or more.

3. The process according to claim 1, wherein said ultra-high-molecular-weight polyolefin solution is rapidly cooled by the die which is being cooled.

4. The process according to claim 1, wherein the cooling temperature in said step (b) is 90° C. or less.

TABLE 1

| | Manufacturing Conditions | | | |
|---|---|---|---|---|
| Example No. | Thickness of Gel-Like Sheet (mm) | Content of Liquid Paraffin in Original Sheet (wt%) | Draw Ratio (L × T)* | Orientation Temperature (°C.) |
| 1 | 6 | 84.0 | 7 × 7 | 115 |
| 2 | .6 | 80.1 | 5 × 5 | 116 |
| 3 | 8 | 78.8 | 6 × 6 | 118 |
| 4 | 10 | 85.0 | 7 × 7 | 122 |

| | | | Characteristic Properties | | | |
|---|---|---|---|---|---|---|
| Example No. | Film Thickness (μm) | Tensile Breaking Strength 15 mm Wide (kg) | Resistance to Passage of Air (Gurley-sec) | Pure Water Flow Rate (L/m² · h · atm) | Rejection of Solute (%) (Mw = 100,000) | Rejection of Solute (%) (Mw = 200,000) |
| 1 | 12 | 5.1 | 60 | 730 | 12 | 67 |
| 2 | 22 | 4.6 | 270 | 430 | 2 | 63 |
| 3 | 38 | 9.7 | 460 | 170 | 17 | 100 |
| 4 | 16 | 5.4 | 120 | 380 | 8 | 66 |

Note *Longitudinal × Lateral

COMPARATIVE EXAMPLE 1

The same procedure as in Example 1 was repeated except that the heated solution of ultra-high-molecular-weight polyethylene was extruded from a T-die without cooling a tip end thereof, and the extrudate was rapidly cooled with an ordinary chill roll. However, it was impossible to obtain a gel-like sheet of uniform thickness because the extrudate suffered from swelling and neck-in immediately after emergence from the die lip. The rapid cooling was performed by dipping the extrudate in water instead of using a chill roll, but the result was similarly poor.

It is noted from the foregoing Examples and Comparative Example that the microporous membrane of ultra-high-molecular-weight polyethylene produced according to the process of the present invention has low resistance passage of air and high pure water flow rate, while it can reject fine solutes such as sugars. It is also noted that the microporous membrane has high mechanical strength on account of its large thickness.

5. The process according to claim 1, wherein the gel-like sheet is stretched at a temperature between the crystal dispersion temperature and the crystal melting point of said ultra-high-molecular-weight polyolefin.

6. The process according to claim 1, wherein said ultra-high-molecular-weight polyolefin is dissolved in a nonvolatile solvent in said step (a).

7. The process according to claim 6, wherein said nonvolatile solvent is paraffin oil.

8. The process according to claim 1, wherein said residual solvent is removed by extraction with a volatile solvent.

9. The process according to any of claims 1 to 8, wherein said ultra-high-molecular-weight polyolefin is ultra-high-molecular-weight polyethylene.

* * * * *